US010373073B2

(12) United States Patent
Kisilev (10) Patent No.: US 10,373,073 B2
(45) Date of Patent: Aug. 6, 2019

(54) CREATING DEEP LEARNING MODELS USING FEATURE AUGMENTATION

(71) Applicant: INTERNATIONAL BUSINESS MACHINES CORPORATION, Armonk, NY (US)

(72) Inventor: Pavel Kisilev, Maalot (IL)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 14/992,047

(22) Filed: Jan. 11, 2016

(65) Prior Publication Data

US 2017/0200092 A1 Jul. 13, 2017

(51) Int. Cl.
| | | |
|---|---|---|
| G06K 9/46 | (2006.01) | |
| G06K 9/62 | (2006.01) | |
| G06N 3/08 | (2006.01) | |
| G06N 20/00 | (2019.01) | |
| G10L 15/06 | (2013.01) | |
| G10L 25/30 | (2013.01) | |

(52) U.S. Cl.
CPC .......... *G06N 20/00* (2019.01); *G06K 9/4628* (2013.01); *G06K 9/6274* (2013.01); *G06N 3/08* (2013.01); *G10L 15/063* (2013.01); *G10L 25/30* (2013.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,368,086 | B2 * | 6/2016 | Oicherman | .............. G09G 5/02 |
| 9,600,628 | B2 * | 3/2017 | Kisilev | ................ G06T 7/0012 |
| 9,668,699 | B2 * | 6/2017 | Georgescu | ........... A61B 5/7267 |
| 9,704,059 | B2 * | 7/2017 | Alpert | .................. G06K 9/4671 |
| 9,730,643 | B2 * | 8/2017 | Georgescu | ................ G06T 7/73 |
| 9,811,905 | B2 * | 11/2017 | Alpert | .................. G06K 9/4671 |
| 9,940,731 | B2 * | 4/2018 | Alpert | .................. G06T 7/0012 |
| 9,999,402 | B2 * | 6/2018 | Chevion | ................... G06T 7/11 |

(Continued)

FOREIGN PATENT DOCUMENTS

WO 2008076600 6/2008

OTHER PUBLICATIONS

ScienceDirect Elsevier Pattern Recognition vol. 36, Issue 9, Sep. 2003, pp. 2007-2017 Hierarchical classification and feature reduction for fast face detection with support vector machines, Bernd Heisele, Thomas Serre, Sam Prentice, Tomaso Poggio.*

(Continued)

*Primary Examiner* — Michael B Holmes
(74) *Attorney, Agent, or Firm* — G. E Ehrlich (57) ABSTRACT

A computer implemented method of automatically creating a classification function trained with augmented representation of features extracted from a plurality of sample media objects using one or more hardware processors for executing a code. The code comprises code instructions for extracting a plurality of features from a plurality of sample media objects, generating a plurality of feature samples for each of the plurality of features by augmenting the plurality of features, training a classification function with the plurality of features samples and outputting the classification function for classifying one or more new media objects.

20 Claims, 4 Drawing Sheets

(56) References Cited

U.S. PATENT DOCUMENTS

| | | | | |
|---|---|---|---|---|
| 10,115,316 | B2* | 10/2018 | Barkan | G09B 7/00 |
| 10,140,709 | B2* | 11/2018 | Kisilev | A61B 5/0013 |
| 2011/0071956 | A1 | 3/2011 | Pinto et al. | |
| 2015/0071539 | A1* | 3/2015 | Kisilev | G06K 9/00785 |
| | | | | 382/170 |
| 2015/0139485 | A1 | 5/2015 | Bourdev | |
| 2015/0227809 | A1* | 8/2015 | Alpert | G06K 9/4671 |
| | | | | 382/132 |
| 2015/0238148 | A1* | 8/2015 | Georgescu | A61B 5/7267 |
| | | | | 600/408 |
| 2015/0332111 | A1* | 11/2015 | Kisilev | G06T 7/0012 |
| | | | | 382/131 |
| 2016/0174902 | A1* | 6/2016 | Georgescu | G06T 7/73 |
| | | | | 600/408 |

OTHER PUBLICATIONS

Enzo Busseti et al., "Deep Learning for Time Series Modeling", CS 229 Final Project Report, Dec. 14, 2012.

Alexey Dosovitskiy et al., "Unsupervised feature learning by augmenting single images", Cornell University Library, Submitted on Dec. 18, 2013 (v1), last revised Feb. 16, 2014.

Jiquan Ngiam et al., "Multimodal Deep Learning", Computer Science Department, Stanford University, 2011.

Ruslan Salakhutdinov., "Learning Deep Generative Models", Departments of Computer Science and Statistical Sciences, University of Toronto,Feb. 2015, p. 23.

Saining Xie et al., "Hyper-class Augmented and Regularized Deep Learning for Fine-grained Image Classification", Computer Vision and Pattern Recognition (CVPR), 2015 IEEE Conference on Date of Conference: Jun. 7-12, 2015, pp. 2645-2654.

A. P. Dempster., "Maximum Likelihood from Incomplete Data via the EM Algorithm", Journal of the Royal Statistical Society. Series B (Methodological), vol. 39, No. 1. (1977), pp. 1-38.

Alex Krizhevsky et al., "Imagenet classification with deep convolutional neural networks", In NIPS, pp. 1106-1114, 2012.

Martin A. Tanner and Wing Hung Wong,. "The Calculation of Posterior Distributions by Data Augmentation" (with discussion), Journal of the American Statistical Association, 82, 528-550, 1987.

Robert H. Swendsen et al., "Nonuniversal Critical Dynamics in Monte Carlo Simulations,"Physical Review Letters, 58, 86-88, 1987.

* cited by examiner

CREATING DEEP LEARNING MODELS USING FEATURE AUGMENTATION

BACKGROUND

The present invention, in some embodiments thereof, relates to creating a classification function for classifying media objects, and, more specifically, but not exclusively, to creating a classification function for classifying media objects by a statistical analysis of features extracted from a plurality of sample media objects.

With the increasing need for recognition and/or detection of captured media objects such as, for example, video streams, images, speech, audio, music and/or hand writing, learning models have become a common practice for classifying the captured media objects. The learning models, such as for example, artificial neural networks (ANN) and/or convolutional neural networks (CNN) are trained with sample data, i.e. sample media objects and continuously evolve (learn) during the process of classifying new (previously unseen) media objects.

To improve generalization and/or avoid overfitting of the learning models the sample data used during the training process may often be subject to data augmentation and/or transformation. Data augmentation aims to increase the sample data base in order to enhance the ability of the learning models to identify, recognize and/or classify invariances of the sample data which is presented in different and/or transformed representations. Data augmentation may also serve to compensate for the limited sample data base available for training the learning models. Data augmentation may present additional major challenges as it may require excessive resources, for example, computation time, storage space and/or computation load.

SUMMARY

According to some embodiments of the present invention there are provided methods for automatically creating a classification function trained with augmented representation of features extracted from a plurality of sample media objects using one or more hardware processor for executing a code. the code comprises code instructions for extracting a plurality of features from a plurality of sample media objects, generating a plurality of feature samples for each one of the plurality of features by augmenting the plurality of features, training a classification function with the plurality of features samples and outputting the classification function for classifying one or more new media objects.

The classification function may perform as one or more regression functions and/or clustering functions.

The classification function is a CNN.

The plurality of features is extracted by submitting the plurality of sample media objects to a CNN during a learning process of the CNN.

Optionally, topology of the classification function is optimized during the extraction of the plurality of features according to a size of each of the plurality of sample media objects.

The augmentation includes applying one or more transformation to each of the plurality of features.

Optionally, the one or more transformations include, a rotation, a shift, a translation, a scaling, a reflection, a geometric transformation, a pixel flip, a noise injection, a speed perturbation, a pitch shifting, a time stretching, a gain induction and/or a frequency spectrum warpage.

According to some embodiments of the present invention there are provided systems for creating a classification function trained with augmented representations of features extracted from a plurality of sample media objects. The system comprises an interface module, a program store storing a code and one or more processors coupled to the interface and the program store for executing the stored code. The code comprises code instructions to extract a plurality of features from a plurality of sample media objects, code instructions to generate a plurality of features samples for each one of the plurality of features by augmenting the plurality of features, code instructions to train a classification function with the plurality of features samples and code instructions to output the classification function for classifying one or more new media objects.

According to some embodiments of the present invention there are provided computer program products for creating a classification function trained with augmented representations of features extracted from a plurality of sample media objects. The computer program product comprises a non-transitory computer readable storage medium and a plurality of program instructions executed by one or more processors from the non-transitory computer readable storage medium. The program instructions comprising first program instructions to extract a plurality of features from a plurality of sample media objects, second program instructions to generate a plurality of features samples for each of the plurality of features by augmenting the plurality of features, third program instructions to train a classification function with the plurality of features samples and fourth program instructions to output the classification function for classifying one or more new media objects.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to creating a classification function for classifying media objects, and, more specifically, but not exclusively, to creating a classification function for classifying media objects by a statistical analysis of features extracted from a plurality of sample media objects.

According to some embodiments of the present invention, there are provided methods, systems and computer program products for creating one or more trained classification functions (models) for classifying one or more media objects, for example, an image, a speech record, hand writing and the likes. The method presented in the present invention may be utilized using one or more of a plurality of classification function models, for example, an ANN and/or a CNN, however for brevity, the CNN model is presented herein without construing any limitation to using other learning models with the present invention. The classification function may be used as a regression function and/or a clustering function for statistical analysis of the media objects.

The process for creating the classification function(s) (model) involves a deep learning process during which a plurality of features are extracted from the sample media objects, augmenting the features to create one or more features maps and training the classification function(s) with the features map(s). Creating the classification function(s) by training the CNN model using the augmented features extracted from the sample media objects may provide significant benefits over current existing methods for media objects classification and more specifically classification models using CNN models. As opposed to the augmented features classification function(s) presented in the present invention the current existing methods for media objects classification consist of, for example, CNN models which are trained with a sample dataset that includes augmenting the sample media objects themselves. It may be demonstrated that the augmented features classification function(s) present the same classification, recognition and/or regression results as the current existing methods for media objects classification.

The main advantages of the augmented features classification function(s) compared to the current existing CNN models may include reduced size of a sample dataset used for training the CNN model, avoiding overfitting of the CNN model and/or providing fast convergence both during the feature extraction phase and/or during the training phase. The size of sample dataset, i.e. the features map(s) may be significantly lower than the size of the original sample media objects and may therefore greatly reduce the time and/or the resources required for training the CNN, for example, training time, storage space and/or computation load. Moreover, traditional methods for media objects classification which use CNN trained using the sample media objects themselves may often be subject to overfitting. Overfitting relates to a situation in which the classification model, i.e. the CNN model focuses on noise and/or random errors present in the sample data rather than on the relationships and/or common characteristics of the samples of the sample dataset. When over-fitted, the CNN model may present poor predictive performance, as it may exaggerate minor fluctuations and/or noise in the data. Overfitting may occur as result of training a complex CNN model having multiple parameters with sample dataset which is too small. By extracting the common features of the sample media objects (sample dataset) noise and/or random errors may be rejected from the training process making the CNN model much more robust. By applying major pooling layers, i.e. sub-sampling layers, along the CNN model the CNN model may fast converge to produce an optimal size for providing best classification, prediction and/or recognition results.

The first step in creating the classification function(s) is feature extraction. Each of the extracted features may be an individual measurable property of the classified media objects. The feature may be an informative, discriminating and independent element that may be used for effective classification, recognition and/or regression of the media object(s). The plurality of features is extracted during a learning process of a CNN model processing the incoming sample media objects to create one or more feature maps. The CNN model may include one or more convolutional layers with pooling layers inserted in between them. The pooling layers are inserted to reduce the amount of data that is processed by the successive convolution layer thus reducing processing load and/or processing time. Each of the convolutional layers may include a plurality of learnable filters (kernels) each having a weight and a bias which are small (smaller than the input sample media object). Each of the filters is applied to sub-regions of each of the sample media objects and is replicated over the entire contents of each of the input sample media objects. Each of the filters may be learned to activate at the detection of one or more features within the sample media objects to create a dot product. The filters may be incorporated with a non-linearity module, for example, a rectified linear unit (ReLU) to apply non-linearity to each bit in convolved data of the filter. Stacking together the activation points of the filters may form the complete activation map and/or feature map of the convolutional layer of the CNN model for each of the features. Following the entire path of CNN model the feature map(s) may be further extended for mapping each of the plurality of features detected in the sample media objects.

The second phase for creating the classification function is training the CNN model with the features map(s) after augmenting them. The feature map(s) may be augmented through an augmentation layer using one or more of a plurality of transformations, for example, rotation, shift, translation, scaling, reflection, geometric transformation, pixel flip and/or noise injection. The augmented features are driven into a fully connected layer of the CNN model to connect the activations from all neurons of the convolutional layers. The outcome of the fully-connected layer may be normalized through a softmax function to reduce the impact of extreme values in the sample media objects without removing them from the sample dataset. The normalized output may be trained by a log loss layer to identify the classification criteria for classifying the sample media objects and naturally new sample media objects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
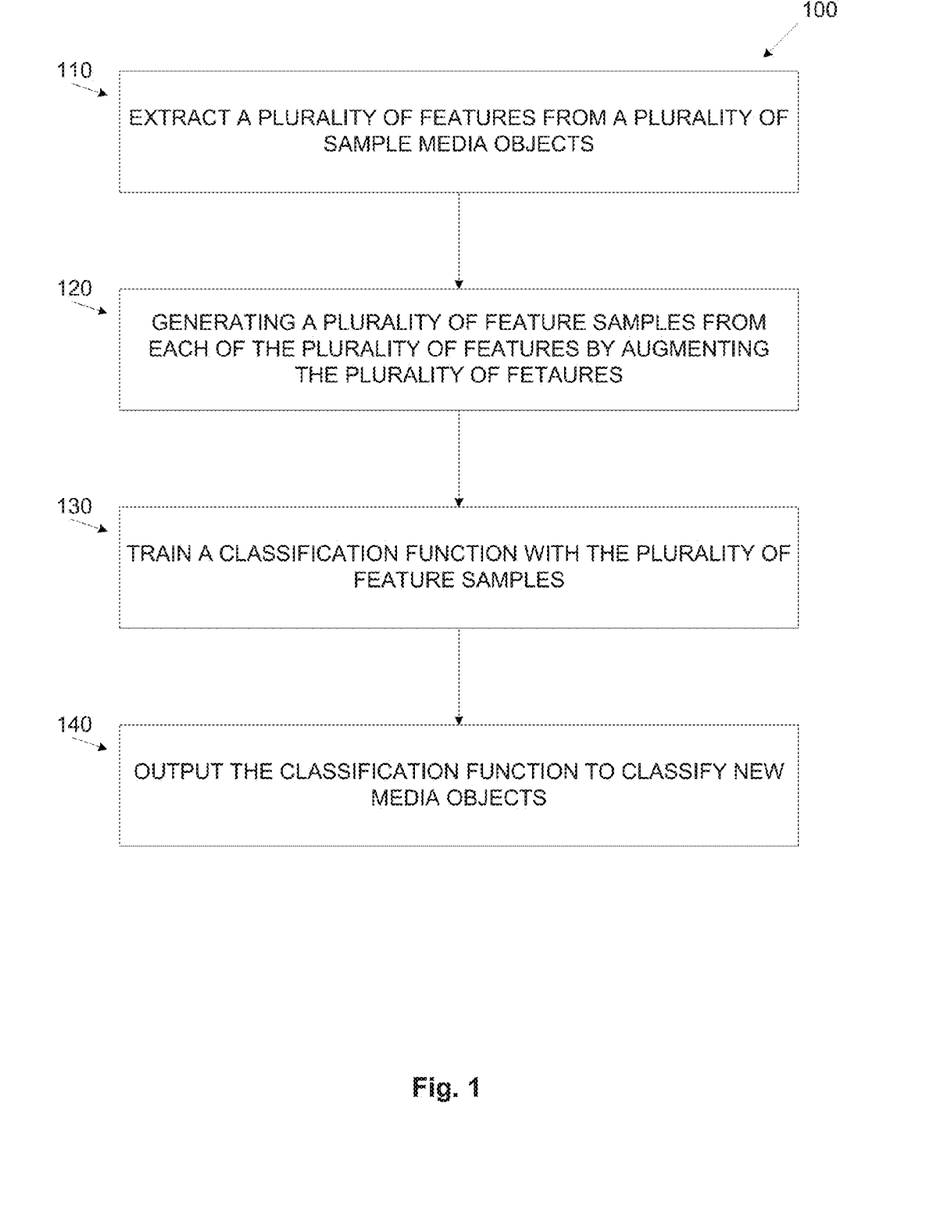
FIG. 1 is a flowchart of an exemplary process for creating a classification function through statistical analysis of augmented representations of features extracted from sample media objects, according to some embodiments of the present invention.

Reference is now made to FIG. 1 which is a flowchart of an exemplary process for creating a classification function through statistical analysis of augmented representations of features extracted from sample media objects, according to some embodiments of the present invention.

As shown at 110, a process 100 for creating one or more classification functions starts with extracting a plurality of features from a sample dataset which may include a plurality of media objects, for example, video streams, images, speech, audio, music and/or hand writing. The plurality of features is extracted during a learning process of a learning model, for example, a CNN model which receives and processes the incoming sample media objects to create one or more feature maps each associated with one of the plurality of features. The CNN model may include one or more convolutional layers each constituted of a plurality of learnable filters (kernels). Each of the filters may have a weight and/or a bias which may be learned during the training process and/or during classification of new and/or previously unseen media objects in order to improve the classification accuracy. The classification function(s) may be used as regression function(s) and/or a clustering function(s) for statistical analysis of the media objects.

Each of the plurality of filters is small (smaller than the input sample media object) and is applied to sub-regions of each of the sample media objects and is replicated over the entire contents of each of the input sample media objects. Each of the filters is convolved (moved across) the patches of each of the incoming sample media objects and is learned to detect one or more features within the sample media objects to generate an activation point dot product. The feature may be an informative, discriminating, non-redundant and/or independent element. The activation points may be stacked together to create a complete activation map and/or feature map of the convolutional layer of the CNN model for one or more of the features. The filters may be incorporated with a non-linearity module, for example, a ReLU to apply non-linearity to each bit in the convolved data of the filter. One or more pooling layers, i.e. sub-sampling layers may be inserted in between the convolutional layers of the CNN model. Sub-sampling may significantly reduce the amount of data within the processed sample media objects which are processed by successive one or more convolution layers, reducing the processed data may significantly reduce processing resources, for example, processing time, computation load and/or storage space consumed by the convolutional layer(s). Following the entire path of CNN model the feature map(s) may be further extended for mapping each of the plurality of features detected in the sample media objects.

Figure 2:
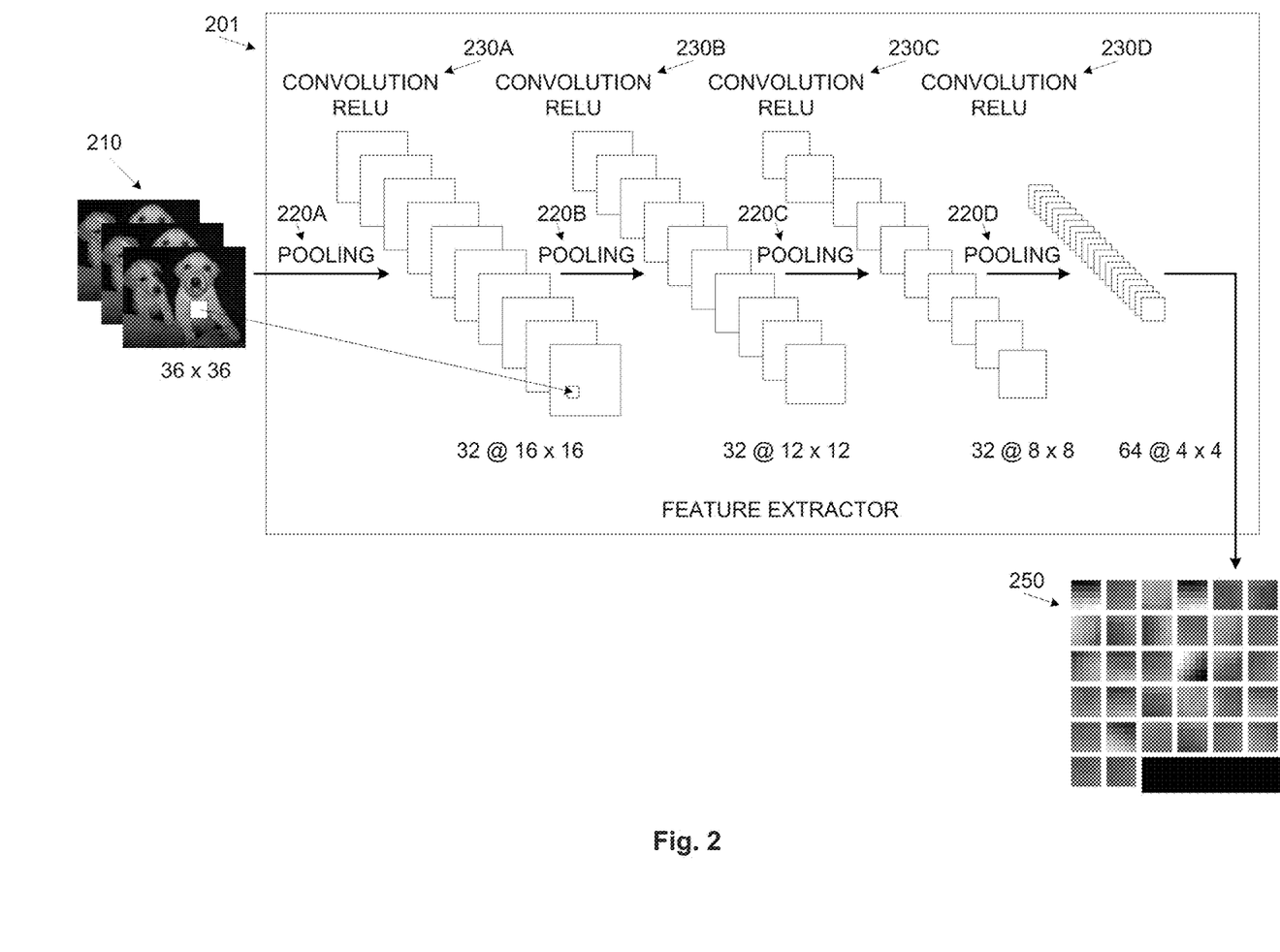
FIG. 2 is a schematic illustration of an exemplary CNN for extracting features from sample media objects, according to some embodiments of the present invention.

Reference is now made to FIG. 2 which is a schematic illustration of an exemplary CNN for extracting features from sample media objects, according to some embodiments of the present invention. A CNN model 201 receives sample dataset 210 comprising a plurality of sample media objects, for example images. The CNN model 201 operates on extracted 36×36 patches from the incoming images of the sample dataset 210. The patch size of 36×36 pixels is a common patch size used for classification, recognition and/or detection of images. Each of the patches of each of the sample images 210 undergoes sub-sampling in the pooling layer 220A to produce 16×16 pixels data segments which are fed into a first convolutional layer 230A. The filters of the convolutional layer 230A process each of the incoming patches to generate a dot product which may be applied with a non-linearity operation, for example, a ReLU function to apply non-linearity to each bit in the convolved data of the filter. Each of the patches moves through the additional layers of the CNN model 201—convolutional layers 230B, 230C and 230D which are each proceeded with a pooling layer 220B, 220C and 220D respectively which further reduce the size of the processed data to further reduce the required processing resources. The outcome of the final convolutional layer 230D is a plurality of feature maps 250, each associated with a respective one of the patches extracted from the incoming sample images 210. The feature map identifies one or more features detected within the respective patch.

Reference is now made once again to FIG. 1. As shown at 120, the plurality of feature maps 250 is augmented, i.e. subjected to one or more of a plurality of transformations in order to increase the sample dataset to increase the generalization level and/or avoid overfitting of the classification function(s). In the event the classification function is created to classify visual objects such as, for example, video streams and/or images the transformations may include, for example, rotation, shift, translation, scaling, reflection, geometric transformation, pixel flip and/or noise injection. For audio and/or acoustic objects classification, the feature maps may be augmented using other transformations, for example, speed perturbation, pitch shifting, time stretching, inducing gain over a frequency spectrum and/or part thereof, warping a frequency spectrum and/or part thereof and/or injecting noise to a frequency spectrum and/or part thereof. The augmentation of the features maps 250 may be done using a CNN augmentation layer which produces a plurality of features samples.

As shown at 130, the plurality of features samples is used to train the one or more classification functions, for example a CNN model to classify new and/or unseen media objects. The variance of the augmented features maps 250 serves to both increase the sample dataset of the features maps 250 and to achieve a higher level of generalization of the classification function thus avoiding overfitting of the classification function to the features maps 250. The classification function CNN model may include a fully connected layer connecting to all neurons of the previous augmentation layer to create a full activation map and/or feature map for each of the features for the classification function CNN model. The produced activation map may be normalized through a softmax function to reduce the impact of extreme values in the features map 250 without removing them from the sample dataset. The normalized output may be trained by a log loss layer to identify the classification criteria for classifying the features map 250 (extracted from the sample media objects 210) and in the same manner classify new and/or unseen sample media objects.

Figure 3:
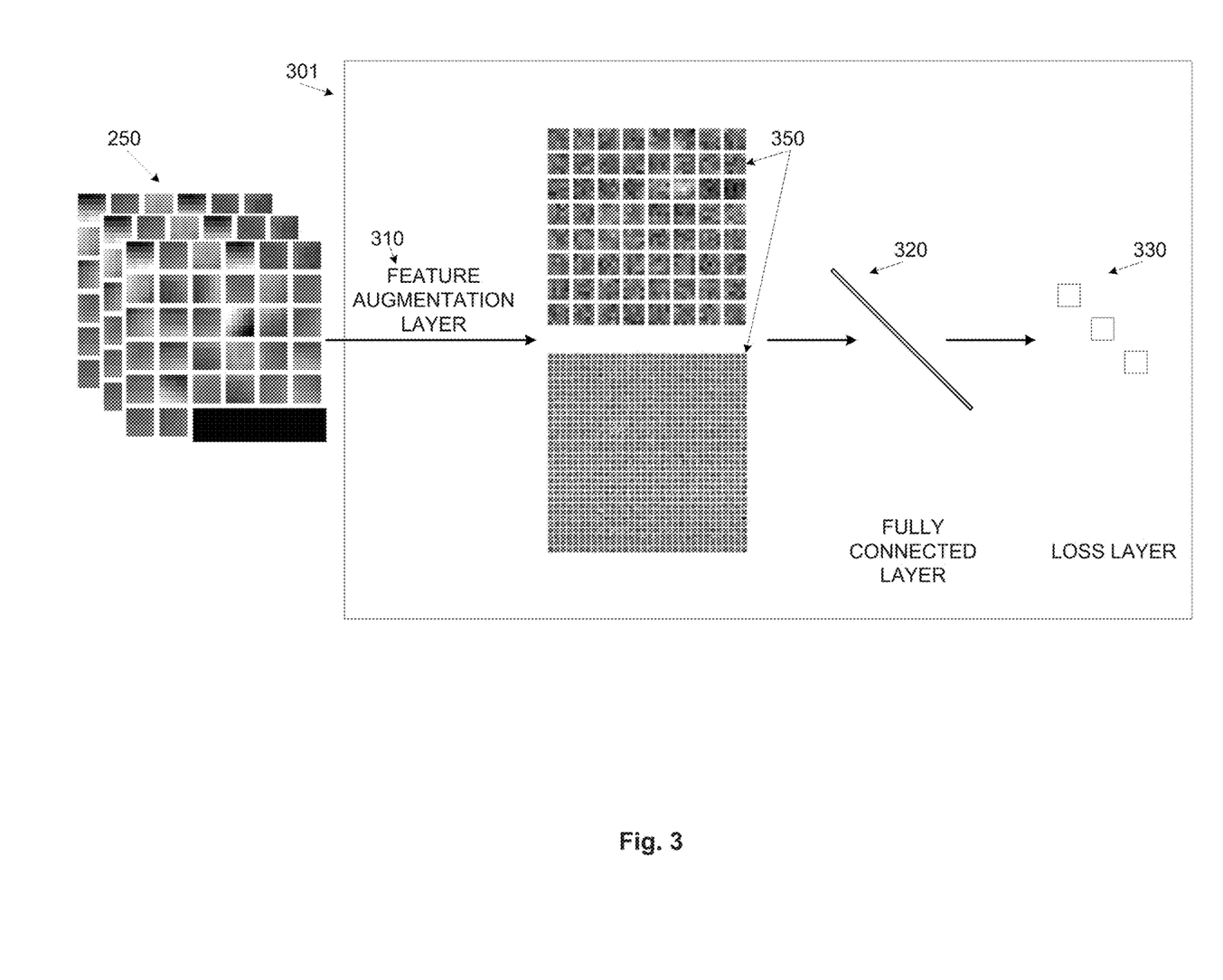
FIG. 3 is a schematic illustration of an exemplary CNN trained with features samples, according to some embodiments of the present invention.

Reference is now made to FIG. 3 which is a schematic illustration of an exemplary CNN trained with feature samples, according to some embodiments of the present invention. An exemplary CNN model 301 describes one possible implementation of A classification function CNN model trained with one or more of a plurality of feature maps such as the feature maps 250 produced by the CNN model 201 using the sample images 210. The CNN model 301 includes an augmentation layer 310 which receives the one or more feature maps 250 and augments the feature map(s) 250 to create a plurality of features samples 350. The one or more transformation may include, for example, rotation, shift, translation, scaling, reflection, geometric transformation, pixel flip and/or noise injection. The features samples are driven into a fully connected layer 320 connecting to all neurons of the augmentation layer 310 to create a full activation map and/or feature map for each of the features for the classification function CNN model 301. The fully connected layer may include a softmax function to normalize the activation maps and/or features maps to reduce the impact of extreme values in the activation map and/or features map 250 without removing them from the sample dataset. The normalized output may be trained by a log loss layer 330 to identify the classification criteria for classifying the features map 250 (extracted from the sample media objects 210) and in the same manner classify new and/or unseen sample media objects.

Reference is now made once again to FIG. 1. As shown at 140, the classification function, for example, the CNN model is outputted to, for example, a user for classifying new and/or unseen media objects.

It may be demonstrated that the classification performance of the classification function CNN model trained with the features sample (data augmentation of the extracted features) is similar to the classification performance of a CNN model trained with data augmentation of the media objects themselves. The following set of equations presents the convolution properties as implemented in the classification function CNN model which imply the same performance is achieved with both augmentation approaches. The following equations set show that in a particular case of augmentation both augmentation methods, namely the data (media samples) based augmentation and the feature based augmentation yield the same result which is the basis for the present invention.

Equation 1 below presents the definition of convolution as applied by each of the convolutional layers of the CNN model.

$$f_1(t) \times f_2(t) = \int_{-\infty}^{\infty} f_1(\tau) \times f_2(t-\tau) d\tau \quad \text{Equation 1:}$$

Where $f_1$ is a media object and $f_2$ is a learned feature map (or filter/kernel). By the nature of the definition of convolution the elements of the convolution function may be interchanged as presented in equation 2 below.

$$f_1(t) \times f_2(t) = \int_{-\infty}^{\infty} f_1(t-\tau) \times f_2(t) d\tau \quad \text{Equation 2:}$$

$$c_1(t) = f_1(t) \times f_2(t) = \int_{-\infty}^{\infty} f_1(\tau) \times f_2(t-\tau) d\tau = \int_{-\infty}^{\infty} f_1(t-\tau) \times f_2(t) d\tau$$

$$f_1(t) \times f_2(t) = c_1(t) \quad \text{Equation 3:}$$

Where $c_1$ is the product of the convolution operation. Using standard convolution rules, produces equations 4 and 5 below. Equation 4 expresses augmentation performed over the sample media objects themselves while equation 5 expresses augmentation of the features extracted from the sample media objects.

$$f_1(t) \times f_2(t-T) = c_1(t-T) \quad \text{Equation 4:}$$

$$f_1(t-T) \times f_2(t) = c_1(t-T) \quad \text{Equation 5:}$$

As reflected from the equations 4 and 5 above, the result of the two augmentation approaches is the same. Using the augmented features maps for training deep learning models such as may present some major advantages while maintaining the same classification performance as the legacy CNN model (trained with augmentation of the sample media objects themselves):

Reducing the sample data size which translates to reduced processing resources, for example, computation time, computation load and/or storage space during the training and/or classification processes.

Avoid overfitting by increasing the sample base using the augmented feature maps and avoiding noise and or random errors which may be present in the sample media objects.

Figure 4:
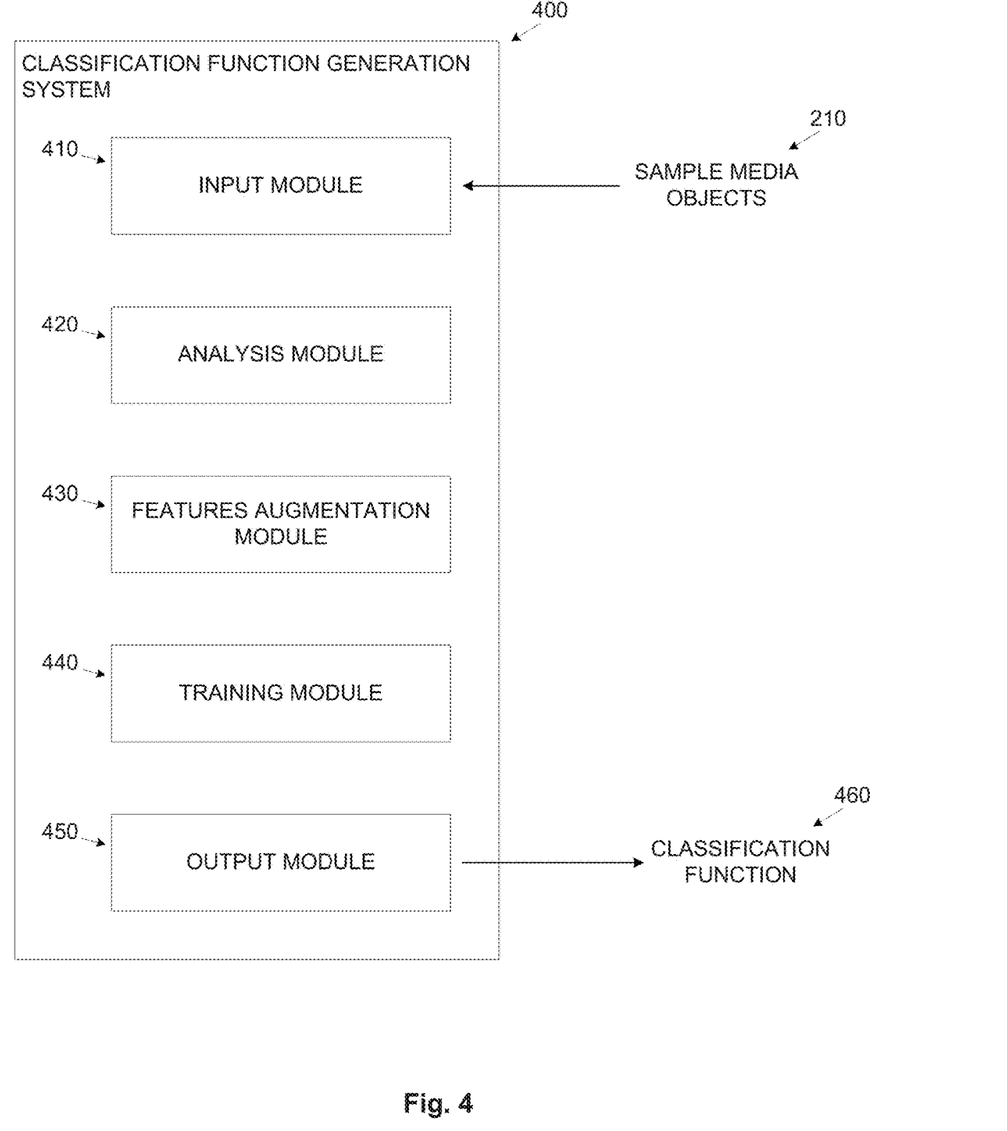
FIG. 4 is a schematic illustration of an exemplary system for creating a classification function through statistical analysis of augmented representations of features extracted from sample media objects, according to some embodiments of the present invention.

Reference is now made to FIG. 4 which is a schematic illustration of an exemplary system for creating a classification function through statistical analysis of augmented representations of features extracted from sample media objects, according to some embodiments of the present invention. A classification function generation 400 includes an input module 410 which receives a plurality of sample media objects, an analysis module 420 which extracts the plurality of features, a features augmentation module 430 which applies transformation(s) to create features samples, a training module 440 which trains a classification function with the features samples and an output module 450 which outputs a classification function 460 to be used for classification of one or more new and/or previously unseen media objects. Wherein a module refers to a plurality of program instructions stored in a non-transitory medium and executed by one or more processors and/or one or more cores of one or more processors. The analysis module 420 may extract one or more features from the plurality of input sample media objects 210 as described in step 110 of the process 100 and as presented by the exemplary CNN model 201. The features augmentation module 430 may apply one or more of the plurality of transformations to create the features samples as described in step 120 of the process 100 and as presented by the exemplary CNN model 301. The training module 440 may perform training of the classification function 460 as described in step 130 of the process 100 and as presented by the exemplary CNN model 301.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for reducing computation processing time, computation load and required storage space in media objects classification, by automatically creating a classification function trained with augmented representation of features extracted from a plurality of sample media objects, comprising;
    reducing computation processing time, computation load and required storage space in creating a classification function, of at least one hardware processor by causing said at least one hardware processor to execute a code comprising code instructions for performing the following:
    extracting a plurality of features from a plurality of sample media objects;
    upon completion of said extraction, generating a plurality of feature samples for each one of said plurality of features by augmenting said plurality of features;
    training said classification function with said plurality of features samples; and
    outputting said classification function for classifying at least one new media object.

2. The computer implemented method of claim 1, wherein said classification function may perform as at least one of: a regression function and a clustering function.

3. The computer implemented method of claim 1, wherein said classification function is a convolutional neural network (CNN).

4. The computer implemented method of claim 1, wherein said plurality of features is extracted by submitting said plurality of sample media objects to a CNN during a learning process of said CNN.

5. The computer implemented method of claim 1, further comprising a topology of said classification function is optimized during said extraction of said plurality of features according to a size of each of said plurality of sample media objects.

6. The computer implemented method of claim 1, wherein said augmentation includes applying at least one transformation to each of said plurality of features.

7. The computer implemented method of claim 6, further comprising said at least one transformation is a member selected from a group consisting of: a rotation, a shift, a translation, a scaling, a reflection, a geometric transformation, a pixel flip, a noise injection, a speed perturbation, a pitch shifting, a time stretching, a gain induction and a frequency spectrum warpage.

8. A system for reducing computation processing time, computation load and required storage space in media objects classification, by creating a classification function trained with augmented representations of features extracted from a plurality of sample media objects, comprising:
    an interface module;
    a program store storing a code, wherein said code, when executed by a processor, causes said processor a reduction in computation processing time, computation load and required storage space in creating a classification function; and
    at least one processor coupled to said interface and said program store for executing said stored code, said code comprising:
        code instructions to extract a plurality of features from a plurality of sample media objects;
        code instructions to generate, upon completion of said extraction, a plurality of features samples for each one of said plurality of features by augmenting said plurality of features;
        code instructions to train said classification function with said plurality of features samples; and
        code instructions to output said classification function for classifying at least one new media object.

9. The system of claim 8, wherein said classification function may perform as at least one of: a regression function and a clustering function.

10. The system of claim 8, wherein said classification function is a CNN.

11. The system of claim 8, wherein said plurality of features is extracted by submitting said plurality of sample media objects to a CNN during a learning process of said CNN.

12. The system of claim 8, further comprising a topology of said classification function is optimized during said extraction of said plurality of features according to a size of each of said plurality of sample media objects.

13. The system of claim 8, wherein said augmentation includes applying at least one transformation to each of said plurality of features.

14. A computer program product for reducing computation processing time, computation load and required storage space in media objects classification, by creating a classification function trained with augmented representations of features extracted from a plurality of sample media objects, comprising:
    a non-transitory computer readable storage medium;
    first program instructions to extract a plurality of features from a plurality of sample media objects;
    second program instructions to generate a plurality of features samples for each one of said plurality of features by augmenting said plurality of features;
    third program instructions to train a classification function with said plurality of features samples; and fourth program instructions to output said classification function for classifying at least one new media object;
wherein said first, second, third and fourth program instructions are executed by at least one processor from said non-transitory computer readable storage medium and wherein said execution of said first, second, third and fourth program instructions causes a reduction in computation processing time, computation load and required storage space in creating said classification function.

15. The computer program product of claim 14, wherein said classification function may perform as at least one of: a regression function and a clustering function.

16. The computer program product of claim 14, wherein said classification function is a CNN.

17. The computer program product of claim 14, wherein said plurality of features is extracted by submitting said plurality of sample media objects to a CNN during a learning process of said CNN.

18. The computer program product of claim 14, further comprising a topology of said classification function is optimized during said extraction of said plurality of features according to a size of each of said plurality of sample media objects.

19. The computer program product of claim 14, wherein said augmentation includes applying at least one transformation to each of said plurality of features.

20. The computer program product of claim 19, further comprising said at least one transformation is a member selected from a group consisting of: a rotation, a shift, a translation, a scaling, a reflection, a geometric transformation, a pixel flip, a noise injection, a speed perturbation, a pitch shifting, a time stretching, a gain induction and/or a frequency spectrum warpage.

* * * * *